United States Patent [19]

Owen et al.

[11] Patent Number: 4,835,366
[45] Date of Patent: May 30, 1989

[54] PORTABLE TEMPERATURE CONTROLLED FLOATING ELECTRIC IMMERSION HEATER FOR A LIVESTOCK WATER TANK

[75] Inventors: Donald B. Owen, Villa Park; Kenneth D. Hartman, Dekalb, both of Ill.

[73] Assignee: Allied Precision Industries, Inc., Geneva, Ill.

[21] Appl. No.: 106,169

[22] Filed: Oct. 7, 1987

[51] Int. Cl.[4] .................. H05B 1/02; H05B 3/80; A01K 7/00

[52] U.S. Cl. ..................... 219/317; 119/73; 219/316; 219/322; 219/328; 219/331; 219/510; 219/517; 219/523

[58] Field of Search ............. 219/331, 328, 322, 323, 219/316, 280, 523, 510, 517, 335, 336, 317; 119/73

[56] References Cited

U.S. PATENT DOCUMENTS

| | | | |
|---|---|---|---|
| 2,430,272 | 11/1947 | Brodie | 219/323 X |
| 2,472,178 | 6/1949 | Temple | |
| 2,511,721 | 6/1950 | Langenbahn | 219/280 X |
| 2,561,932 | 7/1951 | Landgraf | 219/317 |
| 2,576,688 | 11/1951 | Landgraf | 219/323 X |
| 2,977,454 | 3/1961 | Volker | 219/331 |
| 4,041,433 | 8/1977 | Watson | 219/328 X |
| 4,068,116 | 1/1978 | Mc Kinstry | 219/517 X |
| 4,599,973 | 7/1986 | Ward | 219/523 X |

Primary Examiner—Anthony Bartis
Attorney, Agent, or Firm—Allegretti & Witcoff, Ltd.

[57] ABSTRACT

A floating electric water heater for heating livestock watering tanks which maintains the watering tank substantially ice free during low temperatures, thereby providing access to water by a plurality of animals. More particularly, the heater includes a housing supporting an electric heating element for immersion in water to be heated and to a device in the housing for monitoring and regulating operation of the heating element. The device in the housing comprises a temperature responsive switch, which is located in the housing out of contact with the water, and a thermal conductor having both a first end affixed in a thermally conductive manner to a portion of the heating element immersible in the water and a second end affixed in a thermally conductive manner to the temperature responsive switch. The improvement comprises a thermal conductor further containing an extension (cooling) portion extending from the point of connection of its second end to the temperature responsive switch into the water to be heated, such that the extension (cooling) portion is not in contact with the heating element or first end and transmits heat from the temperature responsive switch to the water. Practically, the improvement eliminates the needless cycling by the thermostat, thereby providing maximum heat output into the water when needed.

10 Claims, 1 Drawing Sheet

PORTABLE TEMPERATURE CONTROLLED FLOATING ELECTRIC IMMERSION HEATER FOR A LIVESTOCK WATER TANK

BACKGROUND OF THE INVENTION

A. Field Of The Invention

The present invention relates generally to electric water heaters, and more particularly to portable electric water heaters for use in livestock water tanks exposed to low temperature extremes. The invention further relates to an improved means for regulating the cycling of an electric heating device which substantially prevents the surface of a body of water from freezing in a water tank or the like, thereby providing simultaneous access to the water within the tank by a plurality of livestock at low temperature extremes.

B. Prior Art

Livestock require large amounts of water throughout the year. In order to provide livestock with needed water during the winter months, exterior livestock watering tanks are seasonally equipped with electric water heaters to prevent the water contained therein from icing over during temperatures below freezing (32° F.).

Electric water heaters for livestock watering tanks fall into two categories; submerged and floating. In both categories of water heaters, some method for temperature monitoring and regulation is provided. Temperature monitoring and regulation is necessary to address three problems: (1) the need to cut off power to the heating element when the device is dislocated from the water trough (safety); (2) the need to prevent unnecessary heating in mild temperatures; and (3) the need to provide maximum access to the water at low temperature extremes.

Brodie (U.S. Pat. No. 2,430,272) discloses a portable floating livestock water heater which does not address the safety problem. In Brodie, temperature monitoring and regulation is achieved by means of a bimetallic thermostatic bar for operating a thermostatic switch which controls the power to the heating element. Brodie's metallic bar is located in a position of "maximum response to changes in outside ambient air temperature and to the sun's radiant heat" and has essentially no response to the temperature of the heating element (See Col. 3, ln. 13–16). Thus, the Brodie device, when displaced from the trough as by an animal, would not cut off power to the heating elements until the ambient air was sufficiently hot—possibly as a result of a straw or grass fire.

Temple (U.S. Pat. No. 2,472,178) discloses a portable floating device which responds to the temperature of the water. However, the Temple device provides only minimum access to the water at low temperatures. In Temple, the thermostatic switch monitors the water-temperature immediately below the device and is set to open at "a temperature only . . . slightly above the freezing temperature of water." (Col. 2, ln. 10–14). According to Temple, the apparatus acts to maintain the surface of the water against freezing "over an area encompassed by and extending slightly beyond the periphery of the heating element but will permit the water to freeze over the remainder of the surface". (Col. 2, ln. 15–20). Temple further discloses that in cold weather, the unfrozen area around the device is so small that the animal, which wishes to drink, is required to press its nose against the device, submerging it, so as to gain access to the unfrozen area. Thus, the Temple device, which only permits one animal at a time to drink, is unsuited for use with large herds of livestock.

Langenbahn (U.S. Pat. No. 2,511,721) discloses a self filling stock tank having a non-portable heating device which is an integral part of the tank itself. In Langenbahn, the temperature of the water is monitored indirectly by a thermostat located in an air enclosed chamber immediately above the water wherein the temperature of the air in the chamber is dependent upon the temperature of the water which is immediately below it.

Landgraf (U.S. Pat. No. 2,576,688) discloses a portable tank mounted livestock water heater which addresses both the safety problem and the problem of unnecessary heating in mild temperatures, but the problem of providing maximum access to the water at low temperature extremes.

In Landgraf, the first two problems are solved by monitoring the temperature of the heating coil, as buffered by the water temperature, rather than the air or water alone. Specifically, the heating coil temperature is monitored by means of a submerged air capsule positioned between two legs of the heating coil, wherein two submerged metal plates provided contact between both legs of the heating coil and said capsule. Operationally, as the heating coil heats up, heat from the coil is transferred through the conductive metal plates and water to the capsule, causing the air in the capsule to expand driving a bellows and a plunger. Movement of the plunger past a thermostatically pre-set point automatically cuts off power to the heating coils.

Thus, in Landgraf, the power to the heating coil is cut off when the water is no longer able to dissipate the heat transferred from the heating coils to the air capsule, as when the water temperature locally attains the set temperature, or when the device is displaced from the water and substantially undissipated heat is transferred directly from the heating coil to the air capsule by the conductive metal plates.

Despite its improvements over the prior art, the Landgraf device was only suited to maintaining "an unfrozen opening in the vicinity of the heater large enough for drinking purposes." Col. 1, ln. 11–13. Consequently, the Landgraf device failed to provide a solution to the third problem discussed above: simultaneous access to the water within the tank by a plurality of animals by preventing a substantial area of the tank's surface from freezing.

McKinstry (U.S. Pat. No. 4,068,116) discloses a portable electric water heater having an improvement over the Landgraf device. The McKinstry device eliminates the air capsule, the bellows, and the moving plunger, and runs a "temperature sensing band" (conductive metal strip) from the submerged heating coil directly to a thermal fuse and thermostat. In McKinstry, the heat from the submerged heating coil, which is conducted towards the thermostat by the single conductive metal strip, is dissipated somewhat by the adjacent water. However, like Landgraf, McKinstry does not address the need to provide simultaneous access to the water by a plurality of animals.

Ward (U.S. Pat. No. 4,599,973) was primarily concerned with improving the safety of portable water heaters disclosed by McKinstry and Landgraf. In particular, Ward (U.S. Pat. No. 4,599,973) recognized the problem in McKinstry of poor connections between the heating coil and the conductive metal strip, and further recognized that the problem would only worsen with oxidation or corrosion of the metal surfaces. Ward also preferred to reduce the watt density of the heater as to prevent accidental fires and burns to the livestock (col. 2, ln. 10-16), and to have a device that was more directly responsive to the temperature of the heating element (Col. 1, ln. 61-66), and less responsive to the temperature of the water as he suggests the McKinstry (Col. 1, ln. 55-57) and Landgraf (Col. 1, ln. 67-68 and Col. 2, ln. 1-6) devices were.

Ward's solution was to provide the bottom of his floating device with a heavy duty molded platen-like aluminum housing, having a steel jacketed heating element molded within said housing along its circumference, and having a thermostat bonded to said housing on its inside (upper) surface. In this way, Ward reduced the watt density of the heating element by utilizing the greater surface area of the aluminum housing to dissipate the heat to the water.

However, because Ward was primarily concerned with the problem of safety, Ward did not address the problem of providing maximum access to the water by a plurality of animals during periods of extreme cold.

Moreover, none of the prior art designs disclose or even suggest a design for a portable electric water heater, which is safe even when mishandled, which prevents unnecessary heating in mild temperatures, and which provides maximal access to water at low temperature extremes.

SUMMARY OF THE INVENTION

The present invention relates to a floating water heater for insertion into a livestock watering tank having the following elements: a housing, an elongated heated element, a temperature responsive switch, a thermally conductive strap, a flexible electrical cable and a means for hermetically sealing. The housing has a centrally located access means at the top and contains flotation material within. The floatation material substantially fills the housing but for a centrally located cavity. The elongated heating element is positioned below the housing and has first and second ends which extend upward into the housing cavity. A temperature responsive switch is disposed in the cavity and has a first and second terminal. The first terminal is connected to the first end of the elongated heating element. The thermally conductive strap is attached in a thermally conductive manner to the temperature responsive switch, such that the point of attachment separates the thermally conductive strap into a heat sensing segment and a cooling segment. The heat sensing segment extends below the housing and is conductively affixed at its distal end to the elongated heating element. The cooling segment extends below the housing and avoids contact with the heating element. The flexible electrical cable extends through the access means and has a first end that is disposed in the cavity. The first end has both a first conductor and a second conductor, wherein the first conductor is electrically connected to the second terminal of the temperature responsive switch, the second conductor being electrically connected to the second end of the elongated heating element. The cavity is sealed hermetically.

The present invention further relates to an improvement in a device for monitoring and regulating the temperature of the heating element in an electric water heater, wherein the device has a thermostatically controlled switch and a thermal conductor having a first end and a second end, the first end of the conductor being affixed in a thermally conductive manner to the thermostatically controlled switch, the second end being affixed in a thermally conductive manner to the heating element;

wherein the improvement comprises an extended thermal conductor extending substantially beyond its point of affixation to the thermostatically controlled switch, the extension directed downward below the housing and avoiding contact with the heating element. The thermal conductor extends downward a distance sufficient for it to be immersed in the water when the device is placed in water tank.

DETAILED DESCRIPTION

Figure 1:
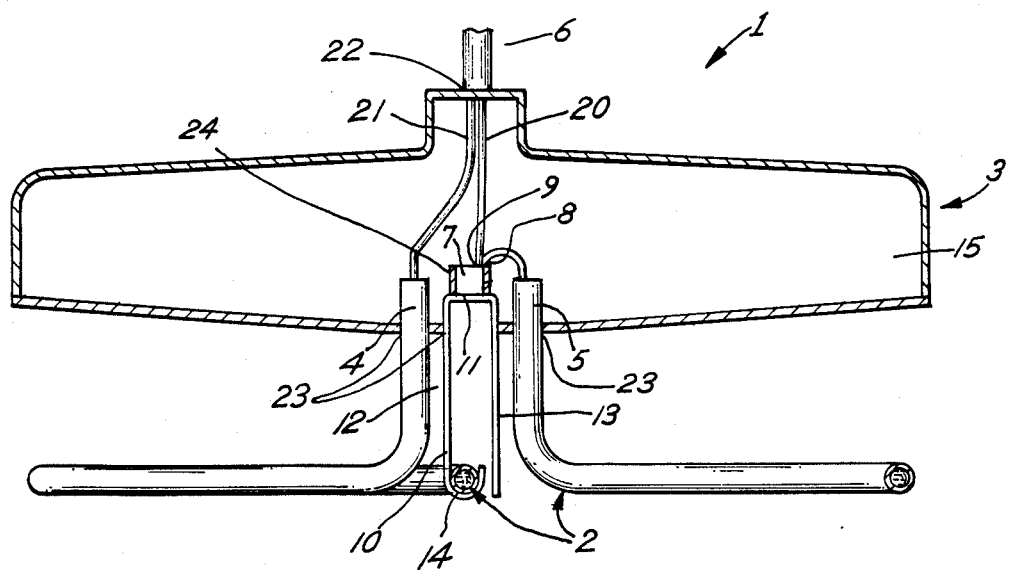
FIG. 1 is a cross sectional view of an embodiment of the present invention.

The presnt invention relates to a portable floating electric water heater for preventing the icing over of a livestock watering tank which is exposed to the low temperature extremes of winter. Although most watering tank heaters can prevent icing over in the immediate vicinity of the heating device, thereby permitting one animal at a time to drink, the water heater of the present invention can safely prevent icing over of substantially the entire surface of a typical 3 foot × 8 foot livestock watering tank, thereby permitting a number of animals to drink at a time—an especially important feature on a large livestock ranch.

The prior art devices, such as disclosed in McKinstry and Landgraf were only capable of maintaining an ice free area in a livestock watering tank in their immediate vicinity. Ward incorrectly suggested that the conductive metal plate of Landgraf and the analogous temperature sending band of McKinstry were monitoring the temperature of the water and not the heating element.

Contrary to the suggestion in Ward, it was discovered that the conductive metal straps (plates and band) of Landgraf and McKinstry were not transmitting solely the temperature of the water to the thermostat. Rather, some of the heat from the heating coil was also being transmitted to the temperature responsive switch or thermostat (hereinafter "thermostat") causing it to cycle on and off, thereby providing less than maximal heat to the water.

It was discovered that the cycling of the water heater in a water trough exposed to the elements could be eliminated by extending the thermally conductive strap, which connects the heating element to the thermostat for a distance beyond its point of connection to the thermostat. Because the extension of the conductive strap is also submerged in the water, it conducts heat away from the thermostat and transfers it into the water.

Thus, whereas the portion of the thermally conductive strap located between the heating element and the thermostat, transfers heat from the heating element to the thermostat, the portion of the thermally conductive strap extending beyond the point of the attachment to the thermostat conducts heat away from the thermostat, effectively moderating the amount of heat transmitted to the thermostat.

In order to effectively conduct heat away from the thermostat, the conductor or strap material must be made from a thermally conductive material, such as copper, aluminum, silver, or the like. The length, width, shape and thickness of the conductor are chosen based on the material selected. However the strap should be of sufficient width so as to be able to effectively dissipate into the water the heat transferred from the heating element. When the strap material is copper, the width of the strap is preferredly from about 0.5 inches to about 3.0 inches, most preferredly from about 0.75 inches to about 1.75 inches.

Similarly, the strap material should be of sufficient thickness to effectively conduct heat from the heating element to the thermostat. When the strap material is copper, the thickness of the strap is preferredly from about 0.005 inches to about 0.15 inches, more preferredly from about 0.02 inches to about 0.10 inches, and most preferredly 0.03 inches to about 0.05 inches.

In order to assure that a good contact is made between the heating element and the thermally conductive strap, the end of said strap is preferredly wrapped around the heating element to provide maximal contact for heat transfer between the heating element and said strap.

The effectiveness of thermal transfer between the metal contact of the heating element and the thermally conductive strap diminishes with oxidation of the metal surfaces, creating a fire or burn hazard if the device is accidently displaced from the trough. Accordingly, it is preferred to employ a solder to provide metal-metal contact. When the thermally conductive strap is copper, the solder is preferredly high temperature silver solder.

The efficacy of the present invention was demonstrated by placing substantially identical heating devices in equally sized livestock watering tanks exposed to temperatures below 32° F. The only distinguishing feature between the two devices was that one of the devices had the segment of the thermally conductive strap, which extends beyond the thermostat (cooling segment), clipped off. The device with the cooling segment intact maintained the water tank substantially ice free, whereas the device with the cooling segment clipped off, maintained an ice free area, as disclosed in the prior art, only in the vicinity of the device itself.

Thus, the present device not only incorporates the trough displacement and mild temperature cut-offs of the prior art devices, the present device solves an important problem not addressed by the prior art—providing maximum access to the water by a plurality of animals during low temperature extremes.

Figure 2:
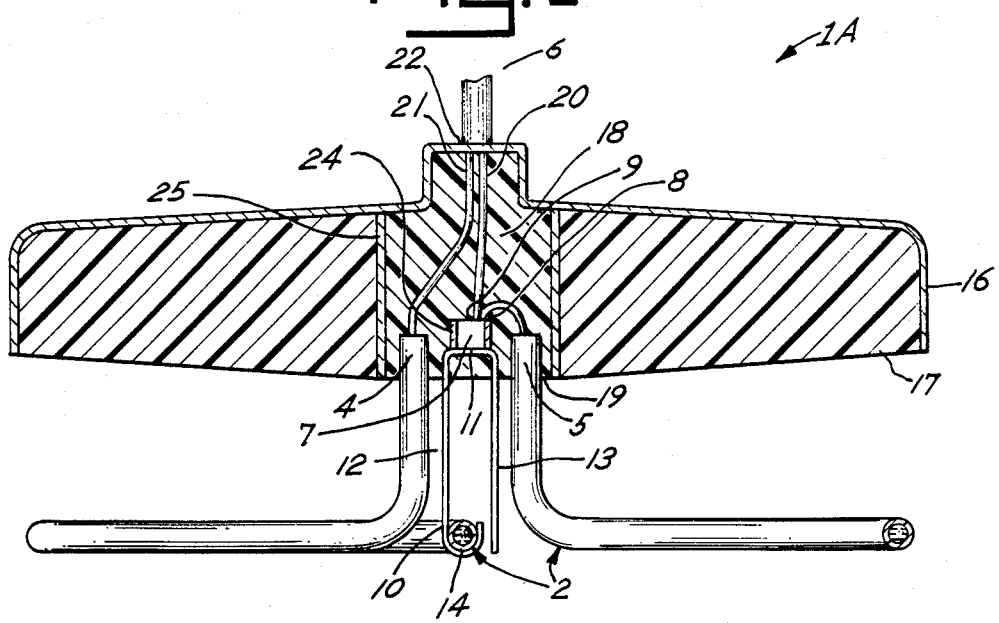
FIG. 2 is a cross sectional view of a preferred embodiment of the present invention.

The apparatus illustrated in FIGS. 1 and 2 are given by way of illustration only and should not be construed as limiting the invention either in spirit or in scope, as many variations will be obvious to those of ordinary skill in the art based upon this disclosure.

DESCRIPTION OF THE PREFERRED EMBODIMENTS

FIG. 1 is directed to an electrical floating livestock tank heater 1 in its most simplified configuration. The device includes a hermetically sealed floatation housing 3, an elongated tubular heating element 2, a thermally conductive strap or thermal conductor 12, a temperature responsive switch or thermostat 7, a flexible electrical cable 6, and conventional means for hermetically sealing the device.

The floatation housing has a centrally located access at the top 22, a plurality of access openings at the bottom 23, and a hollow sealed cavity 15.

The elongated tubular heating element is positioned below the housing and having a first end 5 and a second end 4. Both the first end and the second end project upward through an access opening 23 into the housing.

The temperature responsive switch, which is surrounded in a layer of insulating tape 24, is positioned in the cavity and has a first terminal 8 and a second terminal 9, wherein the first terminal is connected to the first end of the elongated heating element.

The thermally conductive strap 12 is affixed at about an intermediate point 11, preferably its midpoint, in a thermally conductive manner to the temperature responsive switch. The point of attachment divides or separates the strap into a heat sensing segment 10 and a cooling segment 13. The heat sensing segment extends below the floatation housing and is affixed at its distal end to the elongated heating element at a contact point 14. The cooling segment of the thermally conductive strap similarly projects downward below the floatation housing but avoids contact with the elongated heating element.

The flexible power cable 6 enters the floatation housing at the access opening 22 and has a first conductor 20 and a second conductor 21. The first conductor 20 is electrically connected to the second terminal 9 of the temperature responsive switch. The second conductor 21 is electrically connected to the second end 4 of the elongated heating element.

All access points of said device were hermetically sealed with either an epoxy resin, a silicone rubber sealing agent or the like.

FIG. 2 is directed to a particularly preferred floating livestock tank heater 1A containing floatation material within. The device includes a floatation housing 16, an elongated tubular heating element 2, a thermally conductive strap or thermal conductor 12, a temperature responsive switch, or thermostat 7, an insulating material or tape 24 surrounding the circumference of thermostat 7, a flexible electric cable 6, and means for hermetically sealing the device.

The floatation housing is composed of a housing 16, which is open bottomed, and a floatation material 17, such as styrofoam, cork, balsa wood or the like affixed therein. The floatation material substantially fills the housing but for a centrally located cavity 18 defined by a cylindrical wall 25 and having an epoxy filling 19.

The elongated tubular heating element is positioned below the housing and has a first end 5 and a second end 4. Both the first end and the second end project upward centrally located into cavity 18.

The temperature responsive switch 7 is disposed in the cavity 18 and has a first terminal 8 and a second terminal 9, wherein the first terminal is connected to the first end of the elongated heating element.

The thermally conductive strap 12 is affixed at about its midpoint 11 in a thermally conductive manner to the temperature responsive switch 7. The point of attachment divides the strap into a heat sensing segment 10 and a cooling segment 13. The heat sensing segment extends below the floatation housing and is affixed at its distal end to the elongated heating element at a contact point 14. The cooling segment of the thermally conductive strap similarly projects downward below the floatation housing but avoids contact with the elongated heating element. The insulation tape 24 surrounding thermostat 7 serves to protect the thermostat from heat transmitted from terminals 8 and 9 through the epoxy filled cavity 18, thus preventing premature inactivation of the heating elements.

The flexible power cable 6 enters the floatation housing at the access opening 21 and has a first conductor 20 and a second conductor 21. The first conductor 20 is electrically connected to the second terminal 9 of the temperature controlled switch. The second conductor 21 is electrically connected to the second end 4 of the elongated heating element.

The cavity 18 of the device is hermetically sealed by pouring in a filling amount of any suitable waterproof sealant such as an epoxy resin or a silicone sealing material which fixes the legs of the heating element 2 and the thermostat 7 in the housing.

What is claimed is:

1. In an electric water heater having a housing supporting an electric heating element for immersion in water to be heated and a device in said housing for monitoring and regulating operation of the heating element, said device comprising a temperature responsive switch located in the housing out of contact with the water to be heated, a thermal conductor having a first end affixed in a thermally conductive manner to a portion of the heating element immersible in the water and a second end affixed in a thermally conductive manner to the temperature responsive switch;

the improvement wherein said thermal conductor includes an extension portion extending from the point of connection of its second end to the temperature responsive switch to the water to be heated, said extension portion being out of contact with the heating element and transmitting heat from the temperature responsive switch to the water.

2. A device according to claim 1 wherein the thermal conductor is a strap of copper.

3. A device according to claim 2 wherein the means of affixing said second end of said thermal conductor strap to the heating element in the thermally conductive manner is silver solder.

4. A floating electric water heater for insertion into a live stock watering tank comprising a hollow housing having a centrally located access means at the top thereof and containing floatation material within, said floatation material substantially filling the housing but for a centrally located cavity;

an elongated heating element positioned below the housing and having first and second ends wherein both the first and second ends extend upward into the cavity;

a temperature responsive switch being disposed in the cavity and having a first terminal and second terminal, the first terminal being electricaly connected to the first end of an elongated heating element;

a thermal conductor affixed in a thermally conductive manner to the temperature responsive switch, the point of affixation separating the thermal conductor into a heat sensing segment and a cooling segment, the heat sensing segment projecting below the housing and being conductively affixed at its distal end to the elongated heating element, the cooling segment projecting downward below the housing a distance sufficient to be substantially immersed in the water when the heater floats in the water but out of contact with the heating element and said heat sensing portion; and an electrical cable extending through the access means, having a first end that is disposed in the cavity, the first end having a first conductor and a second conductor, the first conductor being electrically connected to the second terminal of the temperature responsive switch, the second conductor being electrically connected to the second end of the elongated heating element.

5. A device according to claim 4 wherein the elongated heating element is tubular.

6. A device according to claim 4 wherein the thermal conductor is a copper strap.

7. A device according to claim 4 wherein the thermal conductor strap is affixed at about its midpoint to the temperature responsive switch.

8. A device as in claim 4 wherein the centrally located cavity is filled with a solid material to hermetically seal the cavity and the temperature responsive switch is surrounded with insulation.

9. A device according to claim 4 wherein the means of conductively affixing the distal end of the heat sensing segment to the elongated heating element is by silver solder.

10. A device according to claim 9 wherein the distal end of the heat sensing segment is wrapped substantially around the elongated heating element prior to silver soldering.

* * * * *